US011404907B2

(12) United States Patent
Razeghi-Jahromi et al.

(10) Patent No.: US 11,404,907 B2
(45) Date of Patent: Aug. 2, 2022

(54) DISTRIBUTED VOLTAGE CONTROL FOR POWER NETWORKS

(71) Applicants: ABB Schweiz AG, Baden (CH); Hitachi Energy Switzerland AG, Baden (CH)

(72) Inventors: Mohammad Razeghi-Jahromi, Raleigh, NC (US); David Coats, Apex, NC (US); James Stoupis, Raleigh, NC (US)

(73) Assignee: HITACHI ENERGY SWITZERLAND AG, Baden (CH)

( * ) Notice: Subject to any disclaimer, the term of this patent is extended or adjusted under 35 U.S.C. 154(b) by 249 days.

(21) Appl. No.: 16/694,448

(22) Filed: Nov. 25, 2019

(65) Prior Publication Data
US 2021/0159726 A1    May 27, 2021

(51) Int. Cl.
*H02J 13/00* (2006.01)
*G05B 13/04* (2006.01)
*H02J 3/18* (2006.01)
*H02J 3/38* (2006.01)

(52) U.S. Cl.
CPC ...... *H02J 13/00002* (2020.01); *G05B 13/042* (2013.01); *H02J 3/18* (2013.01); *H02J 3/381* (2013.01)

(58) Field of Classification Search
None
See application file for complete search history.

(56) References Cited

U.S. PATENT DOCUMENTS

| 5,422,561 | A | 6/1995 | Williams et al. |
| 5,734,586 | A | 3/1998 | Chiang et al. |
| 7,660,649 | B1 * | 2/2010 | Hope ............... G06Q 10/04 700/28 |

(Continued)

FOREIGN PATENT DOCUMENTS

JP    2009065788 A    3/2009

OTHER PUBLICATIONS

Fazio et al., "Zoning Evaluation for Voltage Control in Smart Distribution Networks", 2018, IEEE Explorer. (Year: 2018).*

(Continued)

*Primary Examiner* — Mohammad Ali
*Assistant Examiner* — Kelvin Booker
(74) *Attorney, Agent, or Firm* — Slater Matsil, LLP (57) ABSTRACT

Systems, methods, techniques and apparatuses of power network control are disclosed. One exemplary embodiment is a power network comprising a plurality of zones each including a plurality of measurement devices structured to measure electrical characteristics of the corresponding zone, a zone controller structured to receive measurements from the plurality of measurement devices, a distributed energy resource (DER), and a load. Each zone controller is structured to receive a set of local measurements from the plurality of measurement devices of the corresponding zone, calculate a sensitivity matrix using the received set of local measurements, determine whether a voltage violation has occurred in the corresponding zone, determine a DER set point using the received set of local measurements in response to determining the voltage violation has occurred in the corresponding zone, and transmit the DER set point to the DER.

18 Claims, 5 Drawing Sheets

(56) References Cited

U.S. PATENT DOCUMENTS

| | | | |
|---|---|---|---|
| 8,126,685 B2 | 2/2012 | Nasle | |
| 8,588,993 B2 | 11/2013 | Feng et al. | |
| 8,965,588 B2 | 2/2015 | Milosevic et al. | |
| 2006/0208574 A1* | 9/2006 | Lasseter | H02J 3/38 307/69 |
| 2008/0212343 A1* | 9/2008 | Lasseter | H02J 3/386 363/39 |
| 2008/0215187 A1* | 9/2008 | Lasseter | H02P 9/04 700/282 |
| 2009/0326724 A1* | 12/2009 | Lasseter | H02P 9/04 700/287 |
| 2011/0093127 A1* | 4/2011 | Kaplan | G06Q 10/06 700/297 |
| 2013/0038217 A1* | 2/2013 | Askin | H05B 47/175 315/151 |
| 2013/0345888 A1* | 12/2013 | Forbes, Jr. | G05F 1/66 700/291 |
| 2013/0346768 A1* | 12/2013 | Forbes, Jr. | H02J 3/388 713/310 |
| 2014/0039703 A1* | 2/2014 | Forbes, Jr. | H02J 13/00004 700/286 |
| 2015/0015301 A1* | 1/2015 | Laaksonen | H02S 50/00 324/764.01 |
| 2015/0015302 A1* | 1/2015 | Laaksonen | G01R 31/40 324/764.01 |
| 2016/0118795 A1* | 4/2016 | Berkowitz | G05B 15/02 700/286 |
| 2017/0133849 A1* | 5/2017 | Feng | H02J 3/16 |

OTHER PUBLICATIONS

Gush et al., "Fault detection and location in a microgrid using mathematical morphology and recursive least square methods", Feb. 12, 2018, Electrical Power and Energy Systems 102 (2018) 324-331. (Year: 2018).*

Ntoniadou-Plytaria et al., "Distributed and Decentralized Voltage Control of Smart Distribution Networks: Models, Methods, and Future Research", Nov. 2017, IEEE Transactions on Smart Grid, vol. 8, No. 6. (Year: 2017).*

Hosseinimehr et al., "Different Power Sharing Techniques for Converter-Interfaced DERs in an Autonomous Microgrid", 2014 IEEE. (Year: 2014).*

Calderaro et al., "Coordinated local reactive power control in smart distribution grids for voltage regulation using sensitivity method to maximize active power", 2013, J. Electrical Systems 9-4 (2013): 481-493. (Year: 2013).*

Yazdanian et al., "Distributed Control Techniques in Microgrids", Nov. 2014, IEEE Transactions on Smart Grid, vol. 5, No. 6. (Year: 2014).*

Exposito et al., "Sensitivity-Based Reactive Power Control for Voltage Profile Improvement", Aug. 1993, IEEE Transactions on Power Systems, vol. 8, No. 3. (Year: 1993).*

Razeghi-Jahromi et al., "Distributed Optimal Voltage Regulation for Distribution Networks with DGs at the Energy Delivery Grid Edge with Limited Information Exchange", 2020, 2020 IEEE International Conference on Power Systems Technology (POWERCON). (Year: 2020).*

Latif et al., "Zone Based Optimal Reactive Power Dispatch in Smart Distribution Network Using Distributed Generation", 2017, IEEE. (Year: 2017).*

L. Yu et al., "Optimal Distributed Voltage Regulation for Secondary Networks with DGs," IEEE Transactions on Smart Grid, dated Jun. 2012, pp. 959-967, vol. 3, No. 2, IEEE, Piscataway, USA.

K. E. Antoniadou-Plytaria et al., "Distributed and Decentralized Voltage Control of Smart Distribution Networks: Models, Methods, and Future Research," IEEE Transactions on Smart Grid, dated Nov. 2017, pp. 2999-3008, vol. 8, No. 6, IEEE, Piscataway, USA.

P. N. Vovos et al., "Centralized and Distributed Voltage Control: Impact on Distributed Generation Penetration," IEEE Transactions on Power Systems, dated Feb. 2007, vol. 22, No. 1, pp. 476-483, IEEE, Piscataway, USA.

B. Zhang et al., "An Optimal and Distributed Method for Voltage Regulation in Power Distribution Systems," IEEE Transactions on Power Systems, dated Jul. 2015, vol. 30, No. 4, pp. 1714-1726, IEEE, Piscataway, USA.

* cited by examiner

DISTRIBUTED VOLTAGE CONTROL FOR POWER NETWORKS

BACKGROUND

The present disclosure relates generally to distributed control in a power network. As penetration of distributed energy resources (DERs) in power networks increases, control systems must be capable of responding to sudden changes in power generation causing fluctuations in network voltage. Centralized control systems require the aggregation of large volumes of data, decreasing responsiveness due to the round-trip communication between each controller and a centralized power network control system. Certain power networks use a distributed control system where a plurality of distributed controllers regularly exchange measurements and other data to develop control strategies for the power network. Existing power network distributed control suffers from a number of shortcomings and disadvantages. There remain unmet needs including reducing dependency on external data and other measurements shared by other distributed controllers. For instance, a distributed control system may fail if communication channels between controllers fail or do not have the bandwidth necessary to share the data needed to calculate control strategies. In another example, some power network control systems must receive a priori information about network topology and node sensitivities before calculating a control strategy. In view of these and other shortcomings in the art, there is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY OF THE DISCLOSURE

Exemplary embodiments of the disclosure include unique systems, methods, techniques and apparatuses for power distribution system control. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
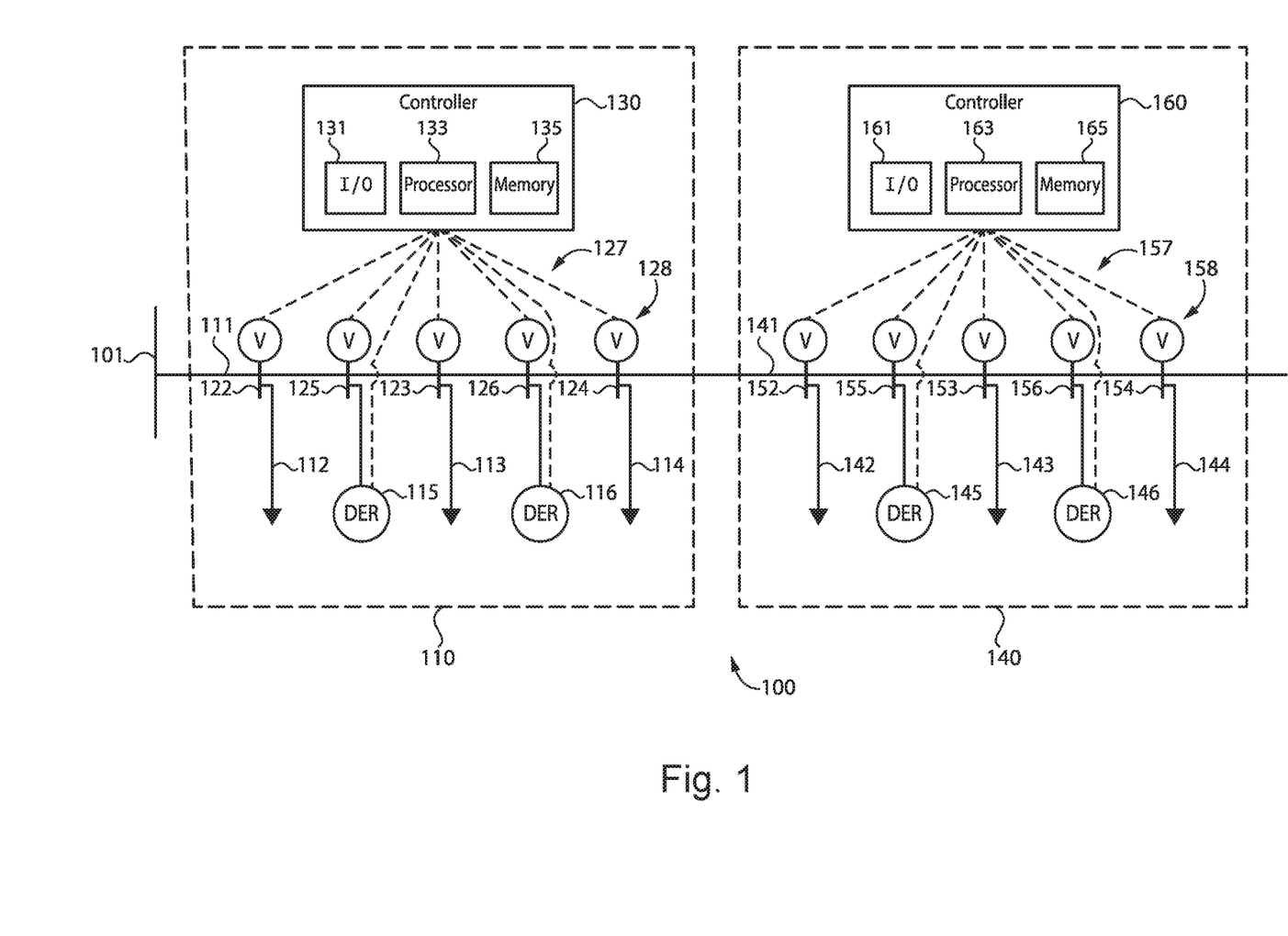
FIG. 1 is a circuit diagram illustrating an exemplary power distribution network.

With reference to FIG. 1, there is illustrated an exemplary power distribution network 100 including zone 110 which includes a number of loads and DERs whose operation is controlled by controller 130 and zone 140 which includes a number of loads and DERs whose operation is controlled by controller 160. Zones 110 and 140 may be logically defined by the control relationship of their respective controllers 130 and 160 with other zone components, devices, and elements, and may respectively cover distinct geographical regions as well as common or overlapping geographical regions. It shall be appreciated that network 100 may be implemented in a variety of applications, including utility grids, power transmission networks, low voltage power distribution, medium voltage power distribution, and high voltage power distribution, to name but a few examples. It shall be appreciated that the topology of network 100 is illustrated for the purpose of explanation and is not intended as a limitation of the present disclosure. For example, network 100 may include more than two zones interconnected by one or more coupling points. Although network 100 is illustrated as a single phase distribution system, network 100 may also be structured to transmit multiphase power.

Zone 110 includes loads, DERs, and measuring devices each coupled to one of a plurality of buses, each bus being coupled to a portion 111 of a distribution line. Loads 112, 113, and 114 are coupled to buses 122, 123, and 124, respectively. Each load may be any type of device or system structured to consume electric power received from the portion 111 of the distribution line. DERs 115 and 116 are coupled to buses 125 and 126, respectively. Each DER is structured to generate power and provide the generated power to loads of network 100 according to set points received from zone controller 130. In certain embodiments, each DER may also be structured to receive and store power. Each DER may include a photovoltaic array, a wind turbine, a natural gas generator, or a battery bank, to name but a few examples.

The plurality of measuring devices 128 are structured to measure electrical characteristics at different nodes of zone 110. In the illustrated embodiment, the plurality of measuring devices 128 are voltage sensors structured to measure the bus voltage of each bus of zone 110. In certain embodiments, the plurality of measuring devices may include current sensors, power sensors, voltage transformers, or current transformers, to name but a few examples. The plurality of measuring devices 128 may be structured to measure voltage magnitude, voltage phase angle, current magnitude, current phase angle, power flow, active power, or reactive power, to name but a few examples. In certain embodiments, one or more of the plurality of measuring devices may be incorporated into another device, such as a DER, to name but one example.

The plurality of measuring devices 128 and DERs 115 and 116 communicate with zone controller 130 by way of a plurality of communication channels 127. In certain embodiments, the plurality of communication channels 127 form a publish and subscribe broker or broker-less data exchange bus. The plurality of measuring device 128 may publish measurements asynchronously to the data bus. Controller 130 may read the published measurements in real-time and transmit commands to DERs 115 and 116 using the data bus. Controller 130 may communicate with the plurality of measuring devices 128 and DERs 115 and 116 using a zone communication protocol such as Message Queuing Telemetry Transport (MQTT), Advanced Message Queuing Protocol (AMQP), Data Distribution Service (DDS), or Open Platform Communication Unified Architecture (OPC UA) to name but a few examples. In certain embodiments, one of the devices of zone 110 may include an adapter to convert from a utility standard protocol such as MODBUS, MODBUS TCP, DNP, or IEC 61850 to one of the zone communication protocols. Data transfer between controller 130, DERs 115 and 116, and the plurality of measuring devices 128 may be secured through messaging protocol authentication (i.e. MQTT ID and password), transport layer security (i.e. TSL), and internet protocol authentication layers.

Zone controller 130 includes an input/output device 131, a processing device 133, and a memory device 135. Zone controller 130 may be a stand-alone device, an embedded system, or a plurality of devices. Zone controller 130 may be an edge device such as a router, routing switch, integrated access device, wireless gateway device, or another type of access device, to name but a few examples.

Input/output device 131 enables zone controller 130 to communicate with other devices of network 100. Input/output device 131 is structured to receive measurements from the plurality of measuring devices 128 and transmit commands, including set points, to DERs 115 and 116. For example, input/output device 131 may be a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. Input/output device 131 may be comprised of hardware, software, or firmware. Input/output device 131 may include more than one of these adapters, credentials, or ports, such as a first port for receiving data and a second port for transmitting data.

Processing device 133 may be a programmable type, a dedicated, hardwired state machine, or a combination thereof. For example, device 133 may be an Advanced Reduced Instruction Set Computing Machine (ARM). Device 133 may include multiple processors, Arithmetic-Logic Units (ALUs), Central Processing Units (CPUs), Digital Signal Processors (DSPs), Field-programmable Gate Array (FPGA), to name but a few examples. For forms of processing device 133 with multiple processing units, distributed, pipelined, or parallel processing may be used. Processing device 133 may be dedicated to performance of just the operations described herein or may be utilized in one or more additional applications. In the illustrated form, processing device 133 is of a programmable variety that executes processes and processes data in accordance with programming instructions (such as software or firmware) stored in memory device 135. Alternatively or additionally, programming instructions are at least partially defined by hardwired logic or other hardware. Processing device 133 may be comprised of one or more components of any type suitable to process the signals received from input/output device 131 or elsewhere, and provide desired output signals. Such components may include digital circuitry, analog circuitry, or a combination of both.

Memory device 135 may be of one or more types, such as a solid-state variety, electromagnetic variety, optical variety, or a combination of these forms, to name but a few examples. Furthermore, memory device 135 may be volatile, nonvolatile, transitory, non-transitory or a combination of these types, and some or all of memory device 135 can be of a portable variety, such as a disk, tape, memory stick, cartridge, to name but a few examples. In addition, memory device 135 may store data that is manipulated by processing device 133, such as data representative of signals received from or sent to input/output device 131 in addition to or in lieu of storing programming instructions.

The zone controllers of network 100 each perform a distributed voltage control algorithm effective to regulate voltage for the entire power network. Since each zone is controlled by its own zone controller, a network is not limited to a number of zones.

Each zone controller of network 100 operates the controllable devices of its corresponding zone without using measurements or other data from measuring devices in other zones to generate the control strategy. Because each zone controller controls the controllable devices of its corresponding zone without communicating with other zones, the distributed zone controllers of network 100 do not require dedicated inter-controller communication channels and are free from the strict communication limitations of other distributed control systems such as latency, synchronization, and bandwidth. Furthermore, the lack of communication between zone controllers during control strategy generation allows for increased responsiveness to voltage violations by the zone controllers.

Unlike a decentralized control system in which zone controllers use only local measurements and adjust set points without considering the effect of neighboring zones, the exemplary zone controllers use local measurements to approximate the effect of other zones in network 100. Each zone controller generates and recursively updates a sensitivity matrix using local measurements. The sensitivity matrix is calculated so as to capture the mutual effect, also known as the coupling effect, of the other zones to the zone of the zone controller without requiring measurements or data from the other zones. As the sensitivity matrix continues to be recursively updated, the matrix's approximation of the effect of other zones becomes more accurate. Furthermore, since the sensitivity matrix is used to calculate set points for the DERs of the zone, the set points will be determined in part based on the sensitivity matrix's approximation of the mutual effect of other zones.

In addition to not requiring measurements or other data from other zone controllers, each zone controller does not require a priori information about zone sensitives for generating the zone control strategy. Instead, each zone controller considers the mutual effects between the zones by initializing and recursively updating its sensitivity matrix using measurements from zone measurement devices.

It shall be appreciated that any or all of the foregoing features of the devices of zone 110 may also be present in the devices of zone 140. For example, the foregoing features of the loads, DERs, measuring devices, and controller of zone 140 may also be present in the loads, DERs, measuring devices, and controller of zone 140.

Zone 140 includes loads, DERs, and measuring devices coupled to a plurality of buses coupled to a portion 141 of a distribution line. Loads 142, 143, and 144 are coupled to buses 152, 153, and 154, respectively. DERs 145 and 146 are coupled to buses 155 and 156, respectively. The plurality of measuring devices 158 are structured to measure electrical characteristics of zone 140. In the illustrated embodiment, the plurality of measuring devices 158 are voltage sensors structured to measure the bus voltage of each bus of zone 140.

Zone controller 160 includes an input/output device 161, a processing device 163, and a memory device 165. The plurality of measuring devices 158, and DERs 145 and 146, communicate with zone controller 160 by way of a plurality of communication channels 157.

As explained in more detail below, each zone controller of network 100 is configured to respond to voltage violations without using measurements or other data received from another zone controller while still considering the coupling effect of other zones. In certain embodiments, zone controllers of network 100 may communicate by way of an inter-controller communication network. For example, a mesh network may be provided to enable zone-to-zone communication for non-time-sensitive control functions. Latency caused from hopping from wireless repeating device-to-device means that synchronized communication may not be possible. However, network 100 is not vulnerable to inter-controller communication limitations such as latency, synchronization, or bandwidth as it does not use inter-controller communication for time-sensitive control functions such as responding to voltage violations. This allows for relaxed requirements for any inter-controller communication network such as infrequent, intermittent, or islanded communication operation modes.

Figure 2:
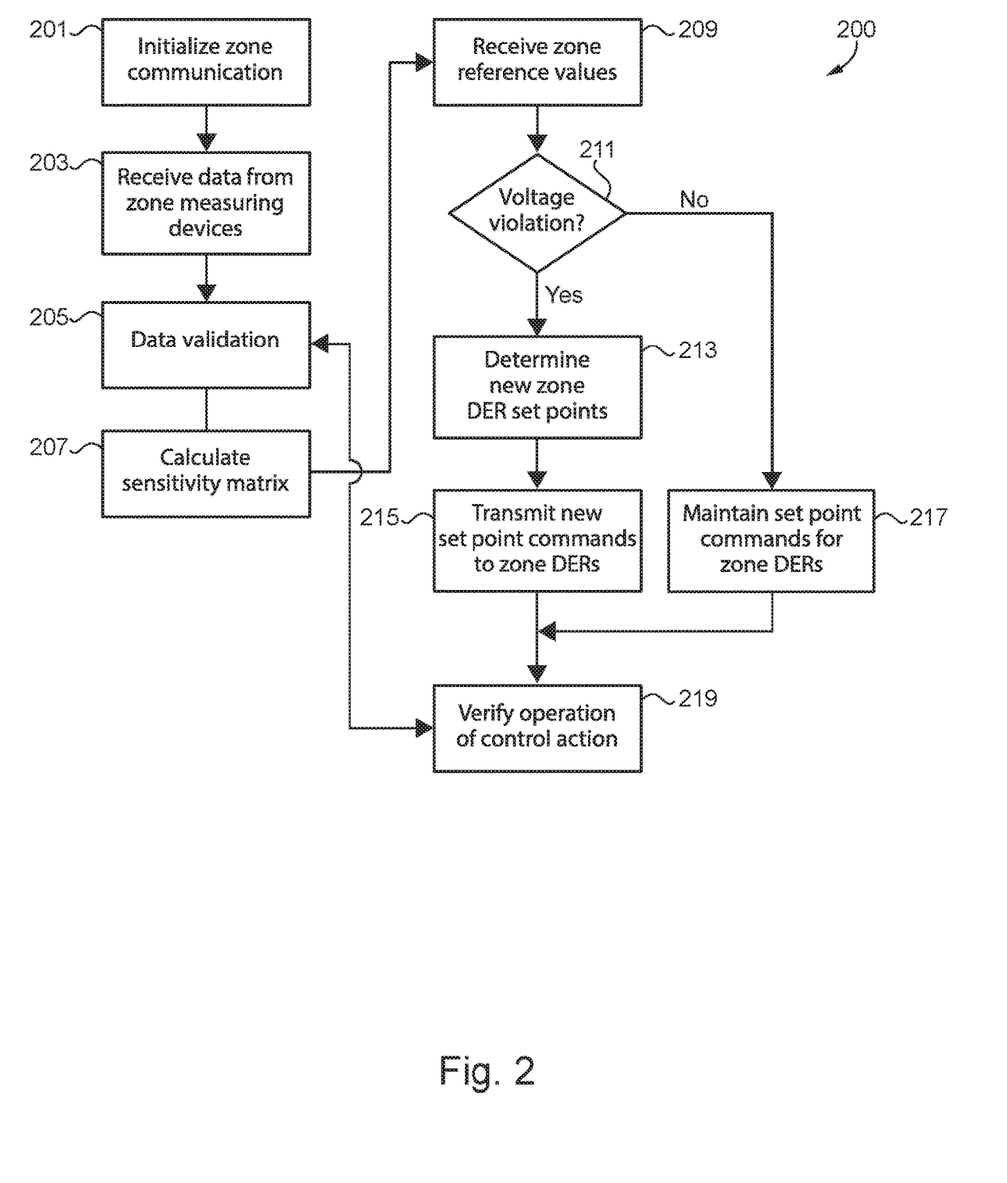
FIG. 2 is a flowchart illustrating an exemplary network control process.

With reference to FIG. 2, there is illustrated an exemplary process 200 for operating a power network including a plurality of interconnected zones, wherein each zone of an exemplary network includes at least one load, at least one distributed energy resource, a plurality of measuring devices, and a zone controller. Process 200 is implemented by the zone controller of each zone in order to produce an aggregated effect of network control. It shall be further appreciated that a number of variations and modifications to process 200 are contemplated including, for example, the omission of one or more aspects of process 200, the addition of further conditionals and operations, the reorganization of the operations and conditionals, the separation of one of more operations and conditionals into a separate process, or the division of one operation into separate operations.

Process 200 begins at operation 201 wherein the zone controller initializes communication with the DERs and the plurality of measuring devices of the same zone.

Process 200 proceeds to operation 203 where the zone controller receives data from the plurality of measuring devices corresponding to electrical characteristics of the zone.

Process 200 proceeds to operation 205 where the zone controller validates the data received in operation 203 by determining whether all the data required to perform operation 207 has been received. Process 200 waits at operation 205 until all required data has been received. During operation 205, the zone controller may also determine whether the data includes false data.

Process 200 proceeds to operation 207 where the zone controller calculates a sensitivity matrix using the measurements received in operation 203. The zone controller does not require a priori information, such as a network topology, or measurements taken in other zones to calculate the sensitivity matrix. The sensitivity matrix defines the relationship between the voltage, phase angle, and real or reactive power measurements taken at multiple nodes within the zone. The sensitivity matrix also captures the effects of the mutual coupling between the zone of the zone controller and the other zones of the power network.

The sensitivity matrix is calculated with a recursive algorithm to reduce the computational cost and make operation 207 suitable for performing at a zone controller. Each time the zone controller performs operation 207, the zone controller calculates one iteration of the recursive algorithm using the most recently received measurements from operation 203.

The sensitivity matrix may be calculated using an ordinary least squares algorithm or a regularized least squares algorithm. The zone controller may select either the ordinary least squares algorithm or the regularized least squares algorithm based on the presence of false data determined in operation 205. The regularized least squares algorithm requires more computational capability than the ordinary least squares algorithm, but is better adapted to manage outlier data, such as data from a malfunctioning or compromised measuring device.

If the zone controller uses the ordinary least square algorithm, the first time the zone controller executes operation 207, the zone controller calculates the sensitivity matrix in accordance with the following set of initializing equations, where i is the zone number, M is an auxiliary matrix, $t_0$ is the initial time instant, A is the measurement matrix, W is the weighting matrix, $\Lambda$ is the sensitivity matrix, and D is the voltage measurement matrix:

$$M_{t_0}^i = (A_{t_0}^{i^T} W_{t_0}^i A_{t_0}^i)^{-1}$$
$$\Lambda_{t_0}^{i^T} = M_{t_0}^i A_{t_0}^{i^T} W_{t_0}^i D_{t_0}^i \quad (1)$$

Weighting matrix W is determined by a user assigning weights based on the age of measurements used to calculate the sensitivity matrix. Measurement matrix A may be defined as follows, where t is the time instant, i is the zone number, $\Delta P$ is the change in zone active power, and $\Delta Q$ is the change in zone reactive power.

$$A_t^i = \begin{bmatrix} \Delta P_1^{i^T} & \Delta Q_1^{i^T} \\ \Delta P_2^{i^T} & \Delta Q_2^{i^T} \\ \vdots & \vdots \\ \Delta P_t^{i^T} & \Delta Q_t^{i^T} \end{bmatrix} \triangleq \begin{bmatrix} a_1^{i^T} \\ a_2^{i^T} \\ \vdots \\ a_t^{i^T} \end{bmatrix} \quad (2)$$

Matrix D may be defined as follows, where $\Delta V$ is the change in voltage, i is the zone number, and t is the time instant.

$$D_t^i \triangleq \begin{bmatrix} \Delta V_1^{i^T} \\ \Delta V_2^{i^T} \\ \vdots \\ \Delta V_t^{i^T} \end{bmatrix} \quad (3)$$

In subsequent executions of operation 207, the following set of equations are used to calculate the sensitivity matrix by updating the sensitivity matrix initially calculated using equation set (1), where i is the zone number, M is an auxiliary matrix, t is the time instant, a is a vector of the measurement matrix, $\Lambda$ is the sensitivity matrix, v is the forgetting factor, I is the identity matrix, $\Delta^2$ is the second difference operator, P is zone active power, Q is zone reactive power, and V is zone voltage:

$$M_t^i = \frac{1}{v_i}\left(M_{t-1}^i - \frac{M_{t-1}^i a_t^i a_t^{i^T} M_{t-1}^i}{v_i + a_t^{i^T} M_{t-1}^i a_t^i}\right), \quad M_t^i \in \mathbb{S}_{++}^{2l_i} \quad (4)$$

$$\Lambda_t^{i^T} = (1 - M_t^i a_t^i a_t^{i^T}) \Lambda_{t-1}^{i^T} + M_t^i a_t^i \Delta^2 V_t^{i^T}$$

where

-continued $$\Delta a_t^{iT} = a_t^{iT} - a_{t-1}^{iT} = [\Delta^2 P_t^{iT} \ \Delta^2 Q_t^{iT}] \quad (5)$$

and $$\Delta^2 V_t^{iT} = \Delta V_t^{iT} - \Delta V_{t-1}^{iT} = V_t^{iT} - 2V_{t-1}^{iT} + V_{t-2}^{iT} \quad (6)$$

If the zone controller uses the regularized least squares algorithm, the first time the zone controller executes operation 207, the zone controller calculates the sensitivity matrix in accordance with the following set of initializing equations, where i is the zone number, M is an auxiliary matrix, $t_0$ is the initial time instant, A is the measurement matrix, W is the weighting matrix, Π is the constant regularization matrix, Λ is the sensitivity matrix, and D is the voltage measurement matrix:

$$M_{t_0}^i = (A_{t_0}^{iT} W_{t_0}^i A_{t_0}^i + \Pi^i)^{-1}$$

$$\Lambda_{t_0}^{iT} = M_{t_0}^i A_{t_0}^{iT} W_{t_0}^i D_{t_0}^i \quad (7)$$

Weighting matrix W is determined by a user assigning weights based on the age of measurements used to calculate the sensitivity matrix. Measurement matrix A may be defined as follows, where t is the time instant, i is the zone number, ΔP is the change in zone active power, and ΔQ is the change in zone reactive power.

$$A_t^i = \begin{bmatrix} \Delta P_1^{iT} & \Delta Q_1^{iT} \\ \Delta P_2^{iT} & \Delta Q_2^{iT} \\ \vdots & \vdots \\ \Delta P_t^{iT} & \Delta Q_t^{iT} \end{bmatrix} \triangleq \begin{bmatrix} a_1^{iT} \\ a_2^{iT} \\ \vdots \\ a_t^{iT} \end{bmatrix} \quad (8)$$

Matrix D may be defined as follows, where ΔV is the change in voltage, i is the zone number, and t is the time instant.

$$D_t^i \triangleq \begin{bmatrix} \Delta V_1^{iT} \\ \Delta V_2^{iT} \\ \vdots \\ \Delta V_t^{iT} \end{bmatrix} \quad (9)$$

In subsequent executions of operation 207, the following set of equations are used to calculate the sensitivity matrix by updating the sensitivity matrix initially calculated using equation set (7), where i is the zone number, M is an auxiliary variable, t is the time instant, a is a vector of the measurement matrix, Λ is the sensitivity matrix, v is the forgetting factor, Π is the constant regularization matrix, I is the identity matrix, $\Delta^2$ is the second difference operator, P is zone active power, Q is zone reactive power, and V is zone voltage:

$$M_t^i = [v(M_{t-1}^i)^{-1} + a_t^i a_t^{iT}(1-v)\Pi^i]^{-1}, M_t^i \in \mathbb{S}_{++}^{2l_i}$$

$$\Lambda_t^{iT} = [1 - M_t^i a_t^i \Delta_t^{iT} - (1-v) M_t^i \Pi^i] \Lambda_{t-1}^{iT} + M_t^i a_t^i \Delta^2 V_t^{iT} \quad (10)$$

where $$\Delta a_t^{iT} = a_t^{iT} - a_{t-1}^{iT} = [\Delta^2 P_t^{iT} \ \Delta^2 Q_t^{iT}] \quad (11)$$

and $$\Delta^2 V_t^{iT} = \Delta V_t^{iT} - \Delta_{t-1}^{iT} = V_t^{iT} - 2V_{t-1}^{iT} + V_{t-2}^{iT} \quad (12)$$

Process 200 proceeds to operation 209 where the zone controller receives reference values from a central controller. In certain embodiments, the zone controller receives a reactive power reference value or instructions corresponding to a reference value.

Process 200 proceeds to conditional 211. If the zone controller determines a voltage violation is not occurring in the zone, process 200 proceeds to operation 217 where the zone controller does not determine new set points, allowing the DERs of the zone to continue the operation using previously determined set points. Process 200 then proceeds to operation 219.

If the zone controller determines a voltage violation is occurring at a point in the zone, process 200 proceeds from conditional 211 to operation 213. At operation 213, the zone controller determines new set points for one or more of the DERs of the zone using the most recently calculated iteration of the sensitivity matrix calculated during operation 207 and a linear programming algorithm. As more iterations of the sensitivity matrix are calculated, the calculated set points become more successful at keeping constrained variables within bounds.

The new set points are determined effective to minimally increase the DER active or reactive power to be within constraints. In certain embodiments, the constraints may include that 1) node voltages are within their lower and upper limits, 2) the active and reactive power generated by the DERs of the zone does not exceed the power consumption of the loads of the zone in order to prevent reverse active power flow, and 3) any increase of power output by a DER does not exceed the capability of the DER. Constraints may be added or removed.

The set points of each DER may be determined using one of the following sets of equations based on the type of voltage violation and the operating mode of the DER. For an undervoltage violation and a DER operating in a power factor correction mode, a zone controller may use the following set of equations to determine a new DER set point, where y is an auxiliary variable, t is the time instant, $V^l$ is the lower bound of the voltage reference value, $V^u$ is the upper bound of the voltage reference value, $\Lambda_{VQ,t}$ is the partition of sensitivity matrix Λ that relates voltage changes to the changes in reactive power, Q is reactive power, DER is the DER for which the set point is being calculated, and $Q_t^{DER}$ is the reactive power set point:

minimize $y_t$ subject to $V^l \leq V_t + \Lambda_{VQ,t} \Delta Q_t^{DER} \leq V^u$ $-Q_t^{Load^T} 1 \leq (Q_t^{DER} + \Delta Q_t^{DER})^T 1 \leq Q_t^{Load^T} 1$ $-Q^{DER,rated} \leq Q_t^{DER} + \Delta Q_t^{DER} \leq Q^{DER,rated}$ $\Delta Q_t^{DER} \leq y_t 1 \quad (13)$ For an overvoltage violation and a DER operating in a power factor correction mode, a zone controller may use the following set of equations to determine a new DER set point, where y is an auxiliary variable, t is the time instant, $V^l$ is the lower bound of the voltage reference value, $V^u$ is the upper bound of the voltage reference value, $\Theta_{VQ,t}$ is the partition of sensitivity matrix Λ that relates voltage changes to the changes in reactive power, Q is reactive power, ER is the DER for which the set point is being calculated, and $Q_t^{DER}$ is the reactive power set point:

maximize $y_t$ subject to $V^l \leq V_t + \Lambda_{VQ,t} \Delta Q_t^{DER} \leq V^u$ $$-Q_t^{Load^T}\mathbf{1} \leq (Q_t^{DER}+\Delta Q_t^{DER})^T\mathbf{1} \leq Q_t^{LOAD^T}\mathbf{1}$$

$$-Q^{DER,rated} \leq Q_t^{DER}+\Delta Q_t^{DER} \leq Q^{DER,rated}$$

$$\Delta Q_t^{DER} \geq y_t\mathbf{1} \qquad (14)$$

For an undervoltage violation and a DER operating in a unity mode, a zone controller may use the following set of equations to determine a new DER set point, where y is an auxiliary variable, t is the time instant, $V^l$ is the lower bound of the voltage reference value, $V^u$ is the upper bound of the voltage reference value, $\Lambda_{VP,t}$ is the partition of sensitivity matrix A that relates voltage changes to the changes in active power, P is active power, and DER is the DER for which the set point is being calculated, and $P_t^{DER}$ is the active power set point:

minimize $y_t$ subject to $V^l \leq V_t + \Lambda_{VP,t}\Delta P_t^{DER} \leq V^u$ $0 \leq (P_t^{DER}+\Delta P_t^{DER})^T\mathbf{1} \leq P_t^{Load^T}\mathbf{1}$ $0 \leq P_t^{DER}+\Delta P_t^{DER} \leq P^{DER,rated}$ $$\Delta P_t^{DER} \leq y_t\mathbf{1} \qquad (15)$$

For an overvoltage violation and a DER operating in a unity mode, a zone controller may use the following set of equations to determine a new DER set point, where y is an auxiliary variable, t is the time instant, $V^l$ is the lower bound of the voltage reference value, $V^u$ is the upper bound of the voltage reference value, $\Lambda_{VP,t}$ is the partition of sensitivity matrix A that relates voltage changes to the changes in active power, P is active power, DER is the DER for which the set point is being calculated, and $P_t^{DER}$ is the active power set point:

maximize $y_t$ subject to $V^l \leq V_t + \Lambda_{VP,t}\Delta P_t^{DER} \leq V^u$ $0 \leq (P_t^{DER}+\Delta P_t^{DER})^T\mathbf{1} \leq P_t^{Load^T}\mathbf{1}$ $0 \leq P_t^{DER}+\Delta P_t^{DER} \leq P^{DER,rated}$ $$\Delta P_t^{DER} \geq y_t\mathbf{1} \qquad (16)$$

In certain embodiments, the time to execute of operation 213 may be monitored. Where the time to execute operation 213 exceeds a threshold, the zone controller, acting as preprocessor, pushes the execution of operation 213 to a cloud-hosted virtual machine. The virtual machine may be located on a remote data center or located on an on-premise server. The results of operation 213 are then transmitted back to the zone controller.

Process 200 proceeds to operation 215 where the zone controller transmits set points to the one or more DERs.

Process 200 proceeds to operation 219 where the zone controller then receives new data from the plurality of measuring devices and verifies the DERs of the zone are operating using the correct set points. Once operation 219 is completed, process 200 returns to operation 205. Process 200 proceeds using the new data received during operation 219 in the same way the data received in operation 203 was used.

With reference to FIGS. 3-7, there are graphs illustrating electrical characteristics of zone 140 of the exemplary power distribution network 100 illustrated in FIG. 1 during a simulation of the exemplary network control process illustrated in FIG. 2 executed by zone controller 160. The graphs also illustrate electrical characteristics of a power network having a topology identical to power network 100 in FIG. 1 during a simulation of a conventional distributed control network wherein distributed controllers of the network exchange data in order to respond to voltage violations. The graphs also illustrate electrical characteristics of a power network having a topology identical to power network 100 in FIG. 1 during a simulation of the power network where the control system did not respond to voltage violations.

For the simulations, each of the DERs of network 100 is a photovoltaic array operating in PFC mode. Each photovoltaic array had a reactive power rating of 150 kVAR. For each bus of zone 140, the lower voltage limit is 7950 V and the upper voltage limit is 7970 V.

The active and reactive power consumption of the loads are varied throughout the simulation. At time to, when the first set of measurements is received by zone controller 160, the reactive power of all the DERs in network 100 are perturbed using multiplicative white Gaussian noise with distribution N(1,0.1). After t0, the DERs in zone 140 are controlled by zone controller 160, but the power output of the DERs in zone 110 is perturbed throughout the remainder of the simulations using multiplicative white Gaussian noise with distribution N(1,0.3), noise sufficient to cause voltage fluctuation in zone 140.

The simulations continued for 2 hours. Zone controller 160 used distributed regularized recursive least squares algorithm for calculating the sensitivity matrix using a forgiveness factor of 0.97 and regularization constant matrix of 0.1×I.

Figure 3:
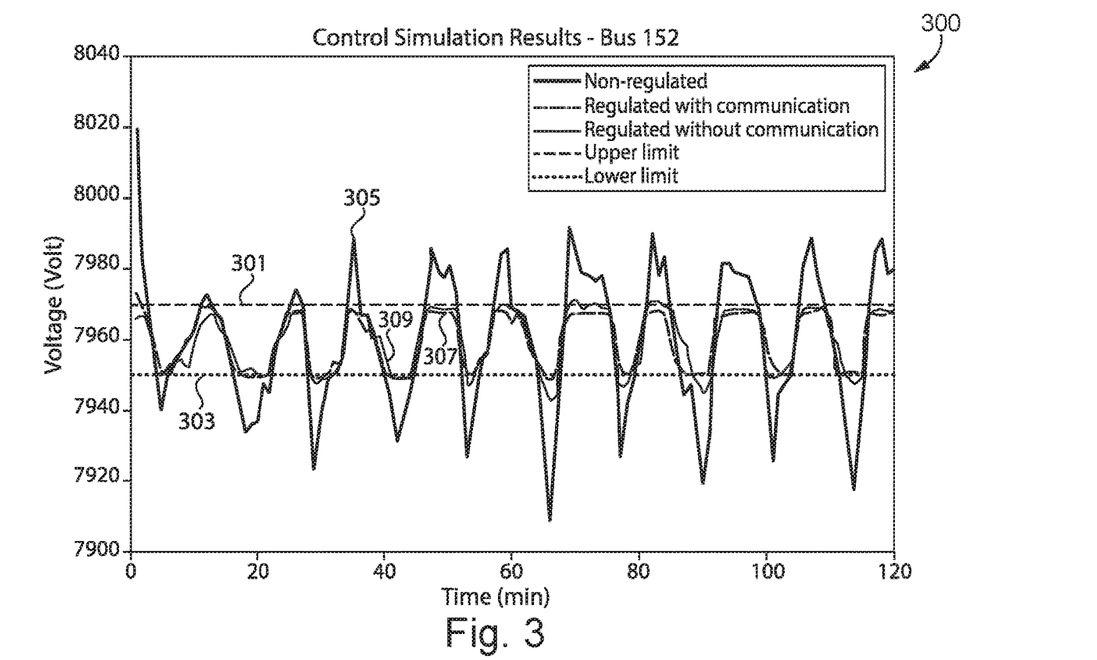
FIGS. 3-7 are graphs illustrating electrical characteristics of the exemplary distribution system illustrated in FIG. 1 during the exemplary zone control process illustrated in FIG. 2.

With continuing reference to FIG. 3, there is a graph 300 illustrating the voltage at bus 152 during the simulations of the non-regulated power network, the exemplary network control process and the conventional network control process. Graph 300 includes a plurality of lines representing lower voltage limit 303, upper voltage limit 301, non-regulated simulation voltage 305, conventional simulation voltage 307, and exemplary simulation voltage 309.

Figure 4:
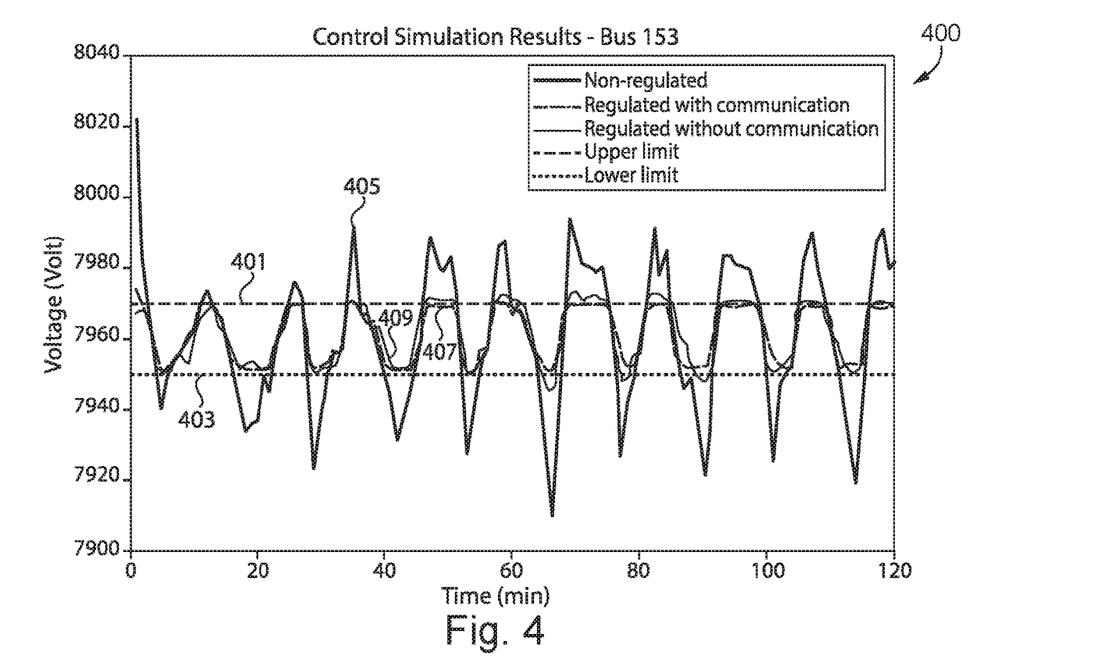

With continuing reference to FIG. 4, there is a graph 400 illustrating the voltage at bus 153 during the simulations of the non-regulated power network, the exemplary network control process, and the conventional network control process. Graph 400 includes a plurality of lines representing lower voltage limit 403, upper voltage limit 401, non-regulated simulation voltage 405, conventional simulation voltage 407, and exemplary simulation voltage 409.

Figure 5:
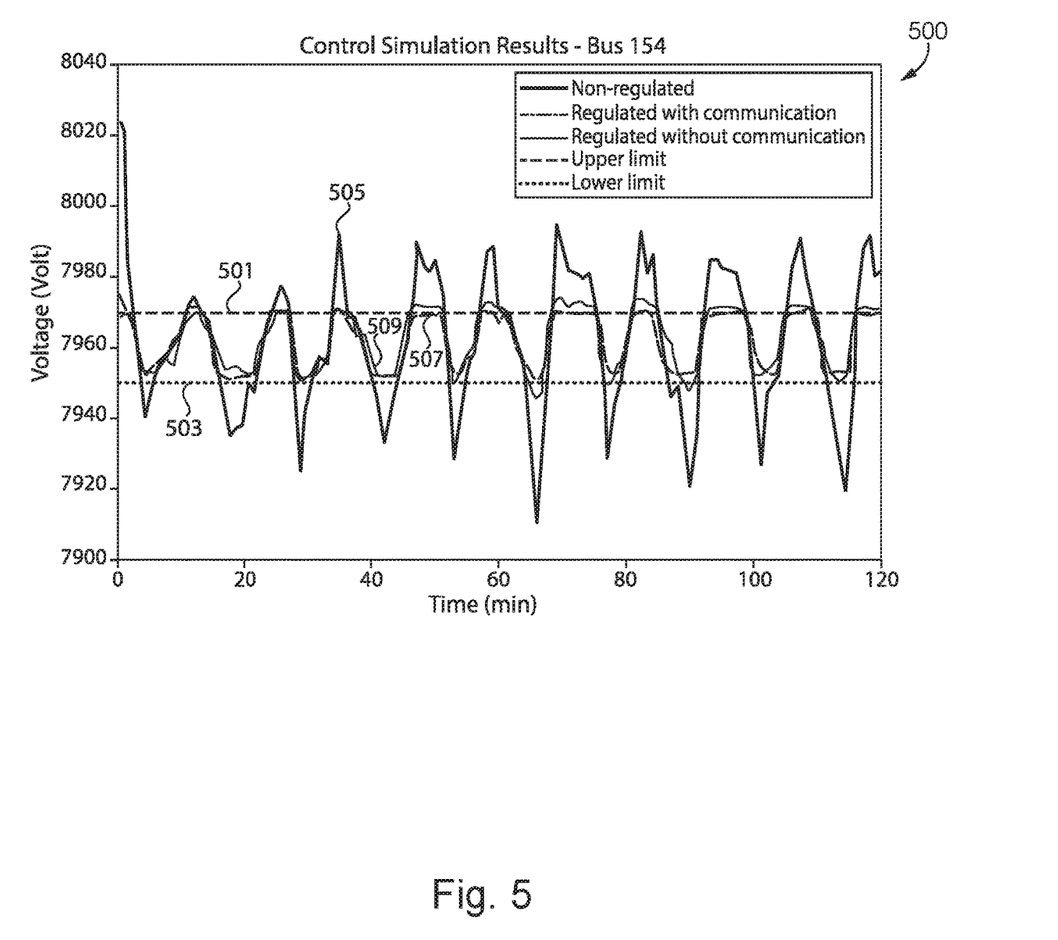

With continuing reference to FIG. 5, there is a graph 500 illustrating the voltage at bus 154 during the simulations of the non-regulated power network, the exemplary network control process, and the conventional network control process. Graph 500 includes a plurality of lines representing lower voltage limit 503, upper voltage limit 501, non-regulated simulation voltage 505, conventional simulation voltage 507, and exemplary simulation voltage 509.

Figure 6:
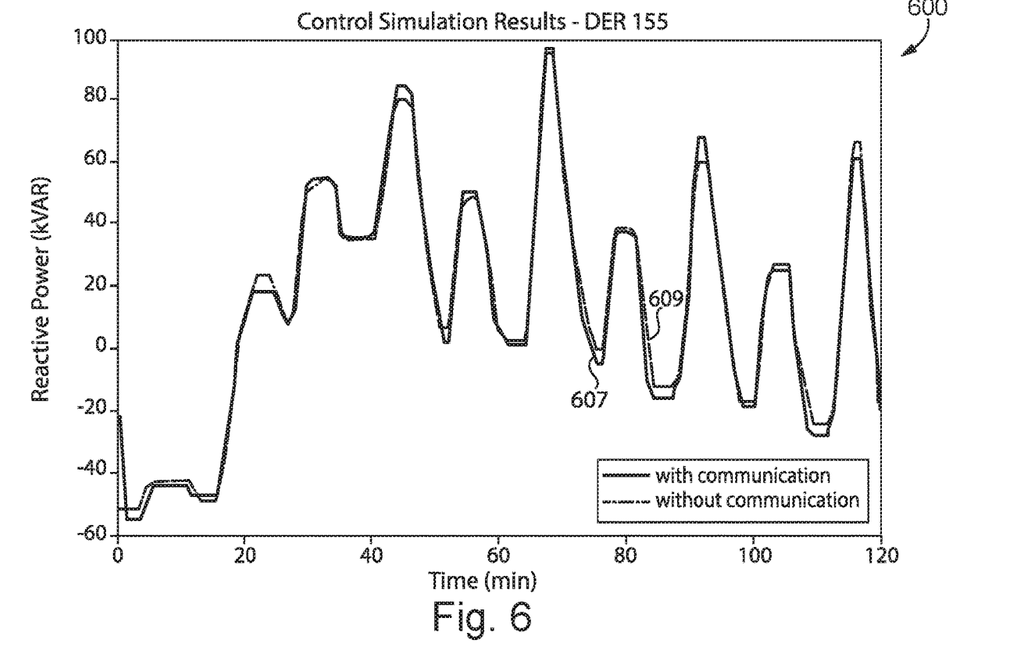

With continuing reference to FIG. 6, there is a graph 600 illustrating reactive power output of DER 145 during the simulations of the exemplary network control process and the conventional network control process. Graph 600 includes a plurality of lines representing exemplary reactive power 609 and conventional reactive power 607.

Figure 7:
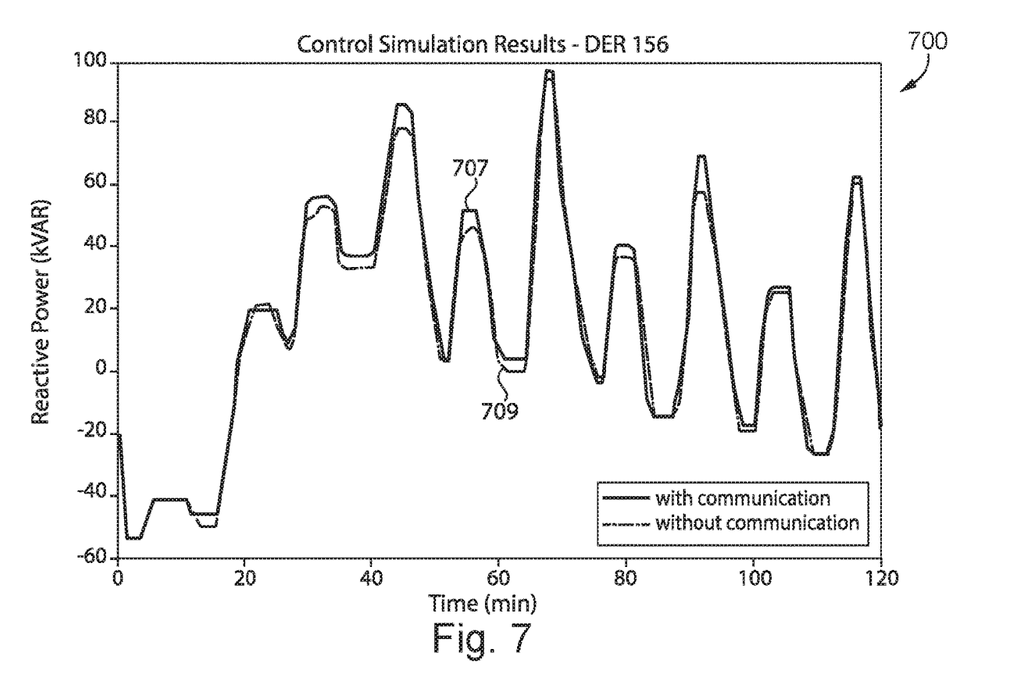

With continuing reference to FIG. 7, there is a graph 700 illustrating reactive power output of DER 146 during the simulations of the exemplary network control process and the conventional network control process. Graph 700 includes a plurality of lines representing exemplary reactive power 709 and conventional reactive power 707.

Further written description of a number of exemplary embodiments shall now be provided. One embodiment is a power network comprising: a plurality of zones each including: a plurality of measurement devices structured to measure electrical characteristics of the corresponding zone, a zone controller structured to receive measurements from the plurality of measurement devices, a distributed energy resource (DER), and a load; wherein each zone controller is structured to receive a set of local measurements from the plurality of measurement devices of the corresponding zone, calculate a sensitivity matrix using the received set of local measurements, determine whether a voltage violation has occurred in the corresponding zone, determine a DER set point using the received set of local measurements in response to determining the voltage violation has occurred in the corresponding zone, and transmit the DER set point to the DER.

In certain forms of the foregoing power network, each zone controller does not use data other than the set of local measurements for calculating the sensitivity matrix, and wherein the calculated sensitivity matrix captures the mutual effects of other zones of the plurality of zones. In certain forms, each zone controller determines whether a voltage violation has occurred by receiving a reference value from outside of the corresponding zone and comparing the reference value to the set of local measurements. In certain forms, the zone controller is structured to receive a second set of local measurements following transmitting the DER set point to the DER and verify the DER is operating using the DER set point using the second set of local measurements. In certain forms, the zone controller updates the sensitivity matrix using the second set of local measurements in a step of a recursive least squares algorithm. In certain forms, the zone controller calculates the sensitivity matrix using the following set of equations where i is a zone number, M is an auxiliary matrix, $t_0$ is an initial time instant, A is a measurement matrix, W is a weighting matrix, $\Pi$ is a constant regularization matrix, $\Lambda$ is a sensitivity matrix, and D is the voltage measurement matrix:

$$M_{t_0}^i = (A_{t_0}^{iT} W_{t_0}^i A_{t_0}^i + \Pi^i)^{-1}$$

$$\Lambda_{t_0}^{iT} = M_{t_0}^i A_{t_0}^{iT} W_{t_0}^i D_{t_0}^i \qquad (17)$$

In certain forms, the measurement matrix A and matrix D are defined as follows:

$$A_t^i = \begin{bmatrix} \Delta P_1^{iT} & \Delta Q_1^{iT} \\ \Delta P_2^{iT} & \Delta Q_2^{iT} \\ \vdots & \vdots \\ \Delta P_t^{iT} & \Delta Q_t^{iT} \end{bmatrix} \triangleq \begin{bmatrix} a_1^{iT} \\ a_2^{iT} \\ \vdots \\ a_t^{iT} \end{bmatrix} \qquad (18)$$

$$D_t^i \triangleq \begin{bmatrix} \Delta V_1^{iT} \\ \Delta V_2^{iT} \\ \vdots \\ \Delta V_t^{iT} \end{bmatrix} \qquad (19)$$

In certain forms, the DER is operating in power factor correction mode, and wherein the zone controller determines the DER set point using a received reactive power reference value and the following set of equations where y is an auxiliary variable, t is a time instant, $V^l$ is a lower bound of a voltage reference value, $V^u$ is an upper bound of the voltage reference value, $\Lambda_{VQ,t}$ is the partition of sensitivity matrix A that relates voltage changes to the changes in reactive power, Q is reactive power, DER is the DER for which the set point is being calculated, and $Q_t^{DER}$ is the reactive power set point:

maximize $y_t$ (for overvoltage)

minimize $y_t$ (for undervoltage)

subject to $V^l \leq V_t + \Lambda_{VQ,t} \Delta Q_t^{DER} \leq V^u$ $-Q_t^{Load^T} 1 \leq (Q_t^{DER} + \Delta Q_t^{DER})^T 1 \leq Q_t^{Load^T} 1$ $-Q^{DER,rated} \leq Q_t^{DER} + \Delta Q_t^{DER} \leq Q^{DER,rated}$ $\Delta Q_t^{DER} \geq y_t 1$ (for overvoltage)

$\Delta Q_t^{DER} \leq y_t 1$ (for undervoltage) $\qquad (20)$

In certain forms, the DER is operating in unity mode, and wherein the zone controller determines the DER set point using the following set of equations where y is an auxiliary variable, t is the time instant, $V^l$ is the lower bound of the voltage reference value, $V^u$ is the upper bound of the voltage reference value, $\Lambda_{VP,t}$ is the partition of sensitivity matrix $\Lambda$ that relates voltage changes to the changes in active power, P is active power, and DER is the DER for which the set point is being calculated, and $P_t^{DER}$ is the active power set point:

minimize $y_t$ (for undervoltage)

maximize $y_t$ (for overvoltage)

subject to $V^l \leq V_t + \Lambda_{VP,t} \Delta P_t^{DER} \leq V^u$ $0 \leq (P_t^{DER} + \Delta P_t^{DER})^T 1 \leq P_t^{Load^T} 1$ $0 \leq P_t^{DER} + \Delta P_t^{DER} \leq P^{DER,rated}$ $\Delta P_t^{DER} \leq y_t 1$ (for undervoltage)

$\Delta P_t^{DER} \geq y_t 1$ (for overvoltage) $\qquad (21)$

In certain forms, determining the DER set point includes the zone controller determining a time to determine the DER set point with the zone controller exceeds a threshold, and wherein the DER set point is determined using a cloud hosted virtual machine in response to determining the time to determine the DER set point with the zone controller exceeds the threshold.

Another exemplary embodiment is a method for operating a power network partitioned into a plurality of zones comprising: operating, with a zone controller, a first zone of the plurality of zones including a plurality of measurement devices structured to measure electrical characteristics of the first zone, a distributed energy resource (DER), and a load; receiving, with the zone controller, a set of local measurements from the plurality of measurement devices of the corresponding zone; calculating, with the zone controller, a sensitivity matrix using the received set of local measurements; determining, with the zone controller, whether a voltage violation has occurred in the corresponding zone; determining, with the zone controller, a DER set point using the received set of local measurements in response to determining the voltage violation has occurred in the corresponding zone; and transmitting, with the zone controller, the DER set point to the DER.

In certain forms of the foregoing method, the zone controller does not use data other than the set of local measurements for calculating the sensitivity matrix wherein the calculated sensitivity matrix captures the mutual effects of other zones of the plurality of zones. In certain forms, the zone controller determines whether a voltage violation has occurred by receiving a reference value from outside of the corresponding zone and comparing the reference value to the set of local measurements. In certain forms, the zone controller is structured to receive a second set of local measurements following transmitting the DER set point to the DER and verify the DER is operating using the DER set point using the second set of local measurements. In certain forms, the zone controller updates the sensitivity matrix using the second set of local measurements in a step of a recursive least squares algorithm. In certain forms, the zone controller calculates the sensitivity matrix using the following set of equations where i is a zone number, M is an auxiliary variable, $t_0$ is an initial time instant, A is a measurement matrix, W is a weighting matrix, $\Pi$ is a constant regularization matrix, $\Lambda$ is a sensitivity matrix, and D is the voltage measurement matrix:

$$M_{t_0}^i = (A_{t_0}^{i^T} W_{t_0}^i A_{t_0}^i + \Pi^i)^{-1}$$

$$\Lambda_{t_0}^{i^T} = M_{t_0}^i A_{t_0}^{i^T} W_{t_0}^i D_{t_0}^i \quad (22)$$

In certain forms, the measurement matrix A and matrix D are defined as follows:

$$A_t^i = \begin{bmatrix} \Delta P_1^{iT} & \Delta Q_1^{iT} \\ \Delta P_2^{iT} & \Delta Q_2^{iT} \\ \vdots & \vdots \\ \Delta P_t^{iT} & \Delta Q_t^{iT} \end{bmatrix} \triangleq \begin{bmatrix} a_1^{iT} \\ a_2^{iT} \\ \vdots \\ a_t^{iT} \end{bmatrix} \quad (23)$$

$$D_t^i \triangleq \begin{bmatrix} \Delta V_1^{iT} \\ \Delta V_2^{iT} \\ \vdots \\ \Delta V_t^{iT} \end{bmatrix} \quad (24)$$

In certain forms, the DER is operating in power factor correction mode, and wherein the zone controller determines the DER set point using a received reactive power reference value and the following set of equations where y is an auxiliary variable, t is a time instant, $V^l$ is a lower bound of a voltage reference value, $V^u$ is an upper bound of the voltage reference value, $\Lambda_{VQ,t}$ is the partition of sensitivity matrix $\Lambda$ that relates voltage changes to the changes in reactive power, Q is reactive power, and DER is the DER for which the set point is being calculated:

maximize $y_t$ (for overvoltage)

minimize $y_t$ (for undervoltage)

subject to $V^l \leq V_t + \Lambda_{VQ,t} \Delta Q_t^{DER} \leq V^u$ $-Q_t^{Load^T} 1 \leq (Q_t^{DER} + \Delta Q_t^{DER})^T 1 \leq Q_t^{Load^T} 1$ $-Q^{DER,rated} \leq Q_t^{DER} + \Delta Q_t^{DER} \leq Q^{DER,rated}$ $\Delta Q_t^{DER} \geq y_t 1$ (for overvoltage)

$\Delta Q_t^{DER} \leq y_t 1$ (for undervoltage) (25)

In certain forms, the DER is operating in unity mode, and wherein the zone controller determines the DER set point using the following set of equations where y is an auxiliary variable, t is the time instant, $V^l$ is the lower bound of the voltage reference value, $V^u$ is the upper bound of the voltage reference value, $\Lambda_{VP,t}$ is the partition of sensitivity matrix $\Lambda$ that relates voltage changes to the changes in active power, P is active power, and DER is the DER for which the set point is being calculated, and $P_t^{DER}$ is the active power set point:

minimize $y_t$ (for undervoltage)

maximize $y_t$ (for overvoltage)

subject to $V^l \leq V_t + \Lambda_{VP,t} \Delta P_t^{DER} \leq V^u$ $0 \leq (P_t^{DER} + \Delta P_t^{DER})^T 1 \leq P_t^{Load^T} 1$ $0 \leq P_t^{DER} + \Delta P_t^{DER} \leq P^{DER,rated}$ $\Delta P_t^{DER} \leq y_t 1$ (for undervoltage)

$\Delta P_t^{DER} \geq y_t 1$ (for overvoltage) (26)

In certain forms, determining the DER set point includes the zone controller determining a time to determine the DER set point with the zone controller exceeds a threshold, and wherein the DER set point is determined using a cloud hosted virtual machine in response to determining the time to determine the DER set point with the zone controller exceeds the threshold.

It is contemplated that the various aspects, features, processes, and operations from the various embodiments may be used in any of the other embodiments unless expressly stated to the contrary. Certain operations illustrated may be implemented by a computer including a processing device executing a computer program product on a non-transient, computer-readable storage medium, where the computer program product includes instructions causing the processing device to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. A power network comprising:
  a plurality of zones each including:
    a plurality of measurement devices structured to measure electrical characteristics of the corresponding zone,
    a zone controller structured to receive measurements from the plurality of measurement devices,
    a distributed energy resource (DER) structured to provide generated power to a load according to a DER set point received from the zone controller, and the load;
wherein each zone controller is structured to:
- receive a set of local measurements from the plurality of measurement devices of the corresponding zone,
- calculate a sensitivity matrix using the received set of local measurements, wherein the calculated sensitivity matrix captures mutual effects of other zones of the plurality of zones,
- determine whether a voltage violation has occurred in the corresponding zone by receiving a reference value from outside of the corresponding zone and comparing the reference value to the set of local measurements,
- determine the DER set point using the sensitivity matrix, in response to determining the voltage violation has occurred in the corresponding zone, and
- transmit the DER set point to the DER.

2. The power network of claim 1 wherein each zone controller does not use data other than the set of local measurements for calculating the sensitivity matrix.

3. The power network of claim 1 wherein determining the DER set point includes the zone controller determining a time to determine the DER set point with the zone controller exceeds a threshold, and wherein the DER set point is determined using a cloud hosted virtual machine in response to determining the time to determine the DER set point with the zone controller exceeds the threshold.

4. The power network of claim 1 wherein the zone controller is structured to receive a second set of local measurements following transmitting the DER set point to the DER and verify the DER is operating using the DER set point using the second set of local measurements.

5. The power network of claim 4 wherein the zone controller updates the sensitivity matrix using the second set of local measurements in a step of a recursive least squares algorithm.

6. The power network of claim 5 wherein the zone controller calculates the sensitivity matrix using the following set of equations where i is a zone number, M is an auxiliary matrix, $t_0$ is an initial time instant, A is a measurement matrix, W is a weighting matrix, $\Pi$ is a constant regularization matrix, $\Lambda$ is a sensitivity matrix, and D is a voltage measurement matrix:

$$M_{t_0}^i = (A_{t_0}^{i^T} W_{t_0}^i A_{t_0}^i + \Pi^i)^{-1}$$

$$\Lambda_{t_0}^{i^T} = M_{t_0}^i A_{t_0}^{i^T} W_{t_0}^i D_{t_0}^i.$$

7. The power network of claim 6 wherein the measurement matrix A and matrix D are defined as follows:

$$A_t^i = \begin{bmatrix} \Delta P_1^{iT} & \Delta Q_1^{iT} \\ \Delta P_2^{iT} & \Delta Q_2^{iT} \\ \vdots & \vdots \\ \Delta P_t^{iT} & \Delta Q_t^{iT} \end{bmatrix} \triangleq \begin{bmatrix} a_1^{iT} \\ a_2^{iT} \\ \vdots \\ a_t^{iT} \end{bmatrix}$$

$$D_t^i \triangleq \begin{bmatrix} \Delta V_1^{iT} \\ \Delta V_2^{iT} \\ \vdots \\ \Delta V_t^{iT} \end{bmatrix}.$$

8. The power network of claim 1 wherein the DER is operating in power factor correction mode, and wherein the zone controller determines the DER set point using a received reactive power reference value and the following set of equations where y is an auxiliary variable, t is a time instant, $V^l$ is a lower bound of a voltage reference value, $V^u$ is an upper bound of the voltage reference value, $\Lambda_{VQ,t}$ is the partition of sensitivity matrix $\Lambda$ that relates voltage changes to the changes in reactive power, Q is reactive power, DER is the DER for which the set point is being calculated, and $Q_t^{DER}$ is the reactive power set point:

maximize $y_t$ (for overvoltage)

minimize $y_t$ (for undervoltage)

subject to $$V^l \leq V_t + \Lambda_{VQ,t} \Delta Q_t^{DER} \leq V^u$$

$$-Q_t^{Load^T} \mathbf{1} \leq (Q_t^{DER} + \Delta Q_t^{DER})^T \mathbf{1} \leq Q_t^{Load^T} \mathbf{1}$$

$$-Q^{DER,rated} \leq Q_t^{DER} + \Delta Q_t^{DER} \leq Q^{DER,rated}$$

$$\Delta Q_t^{DER} \geq y_t \mathbf{1} \text{ (for overvoltage)}$$

$$\Delta Q_t^{DER} \leq y_t \mathbf{1} \text{ (for undervoltage)}.$$

9. The power network of claim 1 wherein the DER is operating in unity mode, and wherein the zone controller determines the DER set point using the following set of equations where y is an auxiliary variable, t is the time instant, $V^l$ is the lower bound of the voltage reference value, $V^u$ is the upper bound of the voltage reference value, $\Lambda_{VP,t}$ is the partition of sensitivity matrix $\Lambda$ that relates voltage changes to the changes in active power, P is active power, and DER is the DER for which the set point is being calculated, and $P_t^{DER}$ is the active power set point:

maximize $y_t$ (for overvoltage)

minimize $y_t$ (for undervoltage)

subject to $$V^l \leq V_t + \Lambda_{VP,t} \Delta P_t^{DER} \leq V^u$$

$$0 \leq (P_t^{DER} + \Delta P_t^{DER})^T \mathbf{1} \leq P_t^{Load^T} \mathbf{1}$$

$$0 \leq P_t^{DER} + \Delta P_t^{DER} \leq P^{DER,rated}$$

$$\Delta P_t^{DER} \leq y_t \mathbf{1} \text{ (for undervoltage)}$$

$$\Delta P_t^{DER} \geq y_t \mathbf{1} \text{ (for overvoltage)}.$$

10. A method for operating a power network partitioned into a plurality of zones comprising:
- operating, with a zone controller, a first zone of the plurality of zones including a plurality of measurement devices structured to measure electrical characteristics of the first zone, a distributed energy resource (DER) structured to provide generated power to a load according to a DER set point received from the zone controller, and the load;
- receiving, with the zone controller, a set of local measurements from the plurality of measurement devices of the corresponding zone;
- calculating, with the zone controller, a sensitivity matrix using the received set of local measurements, the calculated sensitivity matrix capturing mutual effects of other zones of the plurality of zones;
- determining, with the zone controller, whether a voltage violation has occurred in the corresponding zone by receiving a reference value from outside of the corresponding zone and comparing the reference value to the set of local measurements;

determining, with the zone controller, the DER set point using the sensitivity matrix, in response to determining the voltage violation has occurred in the corresponding zone; and transmitting, with the zone controller, the DER set point to the DER.

11. The method of claim 10 wherein determining the DER set point includes the zone controller determining a time to determine the DER set point with the zone controller exceeds a threshold, and wherein the DER set point is determined using a cloud hosted virtual machine in response to determining the time to determine the DER set point with the zone controller exceeds the threshold.

12. The method of claim 10 wherein the zone controller does not use data other than the set of local measurements for calculating the sensitivity matrix.

13. The method of claim 10 wherein the DER is operating in unity mode, and wherein the zone controller determines the DER set point using the following set of equations where y is an auxiliary variable, t is the time instant, $V^l$ is the lower bound of the voltage reference value, $V^u$ is the upper bound of the voltage reference value, $\Lambda_{VP,t}$ is the partition of sensitivity matrix $\Lambda$ that relates voltage changes to the changes in active power, P is active power, and DER is the DER for which the set point is being calculated, and $P_t^{DER}$ is the active power set point:

maximize $y_t$ (for overvoltage)

minimize $y_t$ (for undervoltage)

subject to $V^l \leq V_t + \Lambda_{VP,t} \Delta P_t^{DER} \leq V^u$ $0 \leq (P_t^{DER} + \Delta P_t^{DER})^T 1 \leq P_t^{Load^T} 1$ $0 \leq P_t^{DER} + \Delta P_t^{DER} \leq P^{DER,rated}$ $\Delta P_t^{DER} \leq y_t 1$ (for undervoltage)

$\Delta P_t^{DER} \geq y_t 1$ (for overvoltage).

14. The method of claim 10 wherein the zone controller is structured to receive a second set of local measurements following transmitting the DER set point to the DER and verify the DER is operating using the DER set point using the second set of local measurements.

15. The method of claim 14 wherein the zone controller updates the sensitivity matrix using the second set of local measurements in a step of a recursive least squares algorithm.

16. The method of claim 15 wherein the zone controller calculates the sensitivity matrix using the following set of equations where i is a zone number, M is an auxiliary variable, $t_0$ is an initial time instant, A is a measurement matrix, W is a weighting matrix, $\Pi$ is a constant regularization matrix, $\Lambda$ is a sensitivity matrix, and D is a voltage measurement matrix:

$M_{t_0}^i = (A_{t_0}^{i^T} W_{t_0}^i A_{t_0}^i + \Pi^i)^{-1}$ $\Lambda_{t_0}^{i^T} = M_{t_0}^i A_{t_0}^{i^T} W_{t_0}^i D_{t_0}^i$.

17. The method of claim 16 wherein the measurement matrix A and matrix D are defined as follows:

$$A_t^i = \begin{bmatrix} \Delta P_1^T & \Delta Q_1^T \\ \Delta P_2^T & \Delta Q_2^T \\ \vdots & \vdots \\ \Delta P_t^T & \Delta Q_t^T \end{bmatrix} \triangleq \begin{bmatrix} a_1^{i^T} \\ a_2^{i^T} \\ \vdots \\ a_t^{i^T} \end{bmatrix}$$

$$D_t^i \triangleq \begin{bmatrix} \Delta V_1^{i^T} \\ \Delta V_2^{i^T} \\ \vdots \\ \Delta V_t^{i^T} \end{bmatrix}.$$

18. The method of claim 10 wherein the DER is operating in power factor correction mode, and wherein the zone controller determines the DER set point using a received reactive power reference value and the following set of equations where y is an auxiliary variable, t is a time instant, $V^l$ is a lower bound of a voltage reference value, $V^u$ s an upper bound of the voltage reference value, $\Lambda_{VQ,t}$ is the partition of sensitivity matrix $\Lambda$ that relates voltage changes to the changes in reactive power, Q is reactive power, and DER is the DER for which the set point is being calculated, and $Q_t^{DER}$ is the reactive power set point:

maximize $y_t$ (for overvoltage)

minimize $y_t$ (for undervoltage)

subject to $V^l \leq V_t + \Lambda_{VQ,t} \Delta Q_t^{DER} \leq V^u$ $-Q_t^{Load^T} 1 \leq (Q_t^{DER} + \Delta Q_t^{DER})^T 1 \leq Q_t^{Load^T} 1$ $-Q^{DER,rated} \leq Q_t^{DER} + \Delta Q_t^{DER} \leq Q^{DER,rated}$ $\Delta Q_t^{DER} \geq y_t 1$ (for overvoltage)

$\Delta Q_t^{DER} \leq y_t 1$ (for undervoltage).

* * * * *

UNITED STATES PATENT AND TRADEMARK OFFICE
CERTIFICATE OF CORRECTION

PATENT NO. : 11,404,907 B2  
APPLICATION NO. : 16/694448  
DATED : August 2, 2022  
INVENTOR(S) : Razeghi-Jahromi Page 1 of 1

It is certified that error appears in the above-identified patent and that said Letters Patent is hereby corrected as shown below:

In the Claims

Claim 6, Column 15, Lines 44-58; delete "$M_{t_0}^i = (A_{t_0}^{i^T} W_{t_0}^i A_{t_0}^i + \Pi^i)^{-1}$ $\Lambda_{t_0}^{i^T} = M_{t_0}^i A_{t_0}^{i^T} W_{t_0}^i D_{t_0}^i.$" and insert -- $M_{t_0}^i = \left(A_{t_0}^{i\,T} W_{t_0}^i A_{t_0}^i + \Pi^i\right)^{-1}$
$\Lambda_{t_0}^{i\,T} = M_{t_0}^i A_{t_0}^{i\,T} W_{t_0}^i D_{t_0}^i$ --.

Claim 16, Column 18, Lines 5-9; delete "$M_{t_0}^i = (A_{t_0}^{i^T} W_{t_0}^i A_{t_0}^i + \Pi^i)^{-1}$ $\Lambda_{t_0}^{i^T} = M_{t_0}^i A_{t_0}^{i^T} W_{t_0}^i D_{t_0}^i.$" and insert -- $M_{t_0}^i = \left(A_{t_0}^{i\,T} W_{t_0}^i A_{t_0}^i + \Pi^i\right)^{-1}$
$\Lambda_{t_0}^{i\,T} = M_{t_0}^i A_{t_0}^{i\,T} W_{t_0}^i D_{t_0}^i$ --.

Signed and Sealed this  
Sixth Day of September, 2022

Katherine Kelly Vidal  
*Director of the United States Patent and Trademark Office*